April 19, 1927.

L. R. ZIFFERER

EXPANSION BOLT

Filed April 16, 1925

1,625,013

Inventor:
Lothar R. Zifferer.

Patented Apr. 19, 1927.

1,625,013

UNITED STATES PATENT OFFICE.

LOTHAR R. ZIFFERER, OF COLUMBIA, PENNSYLVANIA.

EXPANSION BOLT.

Application filed April 16, 1925. Serial No. 23,576.

Figure 1:
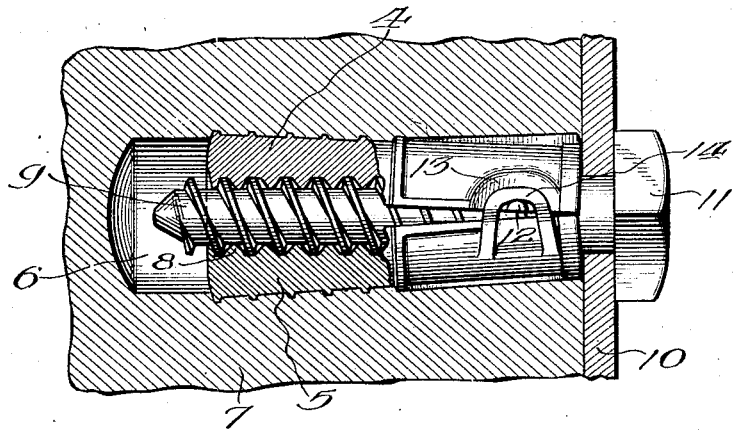
Figure 2:
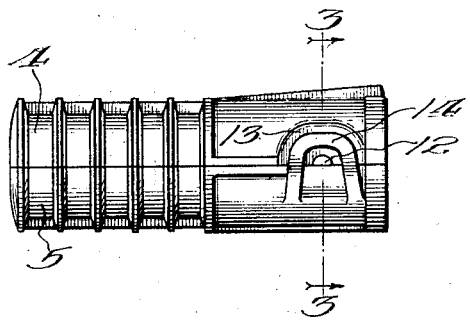
Figure 3:
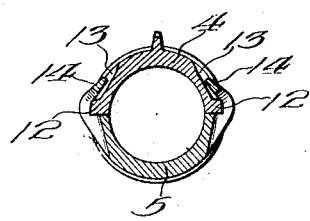

This invention which relates to an expansion bolt is concerned more particularly with the shield component thereof, and with a means of connection between the movable shield parts. It is an object of this invention to devise a suitable connection which will oppose expansion of the shield at its outer end while permitting free separation of its parts at the inner end. I have also provided a connection which may yield slightly as required to adapt the shield for reception of an operating bolt or screw, the diameters of which are not always uniform. In the present connection also I securely hold the shield parts against disassembly. Advantages such as these, as well as others which will presently appear, inhere in my invention of which one embodiment is shown in the accompanying drawing in the manner following:

Figure 1 exhibits partly in section and partly in elevation a complete expansion bolt, as it appears when secured in place;

Fig. 2 is a side elevation of the shield alone, its two parts being in adjacent relation; and Fig. 3 is a transverse section through the shield taken on line 3—3 of Fig. 2, the shield parts, however, being slightly separated after the manner of Fig. 1.

The expansion bolt shown for purposes of illustration includes a shield having two parts 4 and 5 identical in form and construction except for the mutually co-operating means by which they are permanently connected. Each shield part may be suitably configured on its outer surface to engage with the walls of a substantially cylindrical opening 6 formed for its reception in a structure 7 of brick, masonry, concrete, or the like. The walls of the illustrative shield, which may progressively increase in thickness toward its inner end, are shown as provided internally throughout that end with threads 8 for co-operation with like threads of a bolt or screw 9 whose entering end may be tapered toward a point, as shown. Due to this construction, the threaded device used is free to enter between the shield parts at their outer end, but is required to spread or expand the inner shield end into tight engagement with the wall as the bolt or screw is advanced into final position. Because of the characteristics just noted, such a shield may serve effectively to support any desired work 10 in place against the structure 7, the bolt or screw head 11 bearing against the work, as shown.

Expansion shields answering generally to the preceding description have long been known. Means have also been employed to retain the shield parts in assembled relation so as to reduce to a minimum the time and labor required in securing the device in place. The connecting means heretofore employed, however, have not been entirely satisfactory due in part to the lack of uniformity in sizes of the openings interiorly of such shields, in the sizes of the threaded devices used therewith, etc. These variations result from the manufacturing processes which have been adopted as most suitable for the production of such parts. In order to adapt the shield to meet these special conditions, I have provided between its movable parts a connection as follows:

Formed interiorly of one shield part, as 4, near its outer end and on opposite sides thereof, are two studs 12, each of which may stand out from a recess 13 provided in the shield wall. While projecting relatively to the adjacent recesses, these studs need not protrude beyond any of the other external configurations on the shield. In co-operative relation to these studs are two loops 14 which extend laterally and parallel from the other shield part, as 5. Each loop passes around its associated stud so as to engage therewith in a manner which will prevent separation of the two shield parts. The two loops are adapted to lie in the recesses 13 and normally in spaced relation to the two studs whereby to permit a limited lateral and longitudinal movement between the shield parts at their outer ends. Because of this characteristic the movable components of the shield may be related closely as shown in Fig. 2, or distantly, as in Figs. 1 and 3.

The loop and stud connection thus provided also functions as a hinge in that the shield parts may swing away from each other at their inner ends. This is desirable in order that effective engagement with the wall may take place when the attaching bolt or screw is moved toward final position. It is, in fact, even desirable that the shield be not permitted at any time to expand with freedom at its outer end, and by the connection described I have safeguarded against any such contingency. Because of the limited lateral and longitudinal movement provided through the slip connection between the two loops and their associated studs, the present shield parts may adjust sufficiently to accommodate a desired bolt or screw and to permit registrations of their threads, even though the sizes of the co-operating parts may have varied considerably from that which was intended.

An expansion shield having between its movable parts a connection of the kind noted may constitute one embodiment of my invention, although, as defined by the appended claims, the construction may manifestly be modified in minor particulars. The number of parts entering into the shield construction may desirably be two, as shown and described herein, or one, three, or any other suitable number.

I claim:

1. In an expansion bolt, a shield divided longitudinally in a straight line on opposite sides whereby to provide two complementary parts each having a pair of abutting edges extending straight from end to end, a pair of loops formed on one part and extending past the abutting meeting edges to overlap the other part in closely adjacent relation, and a pair of studs upstanding from the latter shield part, each adjacent the straight edge thereof and within one loop extending from the other shield part, whereby to provide a hinge connection between the two shield parts, substantially as described.

2. In an expansion bolt, a shield formed of two parts having mutual abutting edges which extend in a straight line lengthwise of the shield, one of said parts having upon opposite sides of its face recesses adjacent said abutting edges, loops disposed within said recesses and extended from the other shield part with which they are integrally formed, and a stud within each recess adjacent the abutting edges and disposed also within the loop which extends from the other part, the stud being spaced from the loop when the two shield parts are in abutting relation whereby to provide a loose hinge connection therebetween, substantially as described.

LOTHAR R. ZIFFERER.